US012695375B2

(12) United States Patent
Tanaka

(10) Patent No.:    US 12,695,375 B2
(45) Date of Patent:       Jul. 28, 2026

(54) POWER SUPPLY DEVICE INCLUDING FAULT DETECTION CIRCUIT

(71) Applicant: ROHM CO., LTD., Kyoto (JP)

(72) Inventor: Kunimasa Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 141 days.

(21) Appl. No.: 18/403,427

(22) Filed: Jan. 3, 2024

(65) Prior Publication Data

US 2024/0136914 A1    Apr. 25, 2024
US 2024/0235375 A9    Jul. 11, 2024

Related U.S. Application Data

(63) Continuation of application No. PCT/JP2022/024896, filed on Jun. 22, 2022.

(30) Foreign Application Priority Data

Jul. 16, 2021    (JP) ................................. 2021-117613

(51) Int. Cl.
  *H02M 1/32*       (2007.01)
  *H02M 1/36*       (2007.01)
  *H02M 3/158*      (2006.01)
(52) U.S. Cl.
  CPC ............... *H02M 1/32* (2013.01); *H02M 1/36* (2013.01); *H02M 3/158* (2013.01)

(58) Field of Classification Search
  CPC .......... H02M 1/32; H02M 1/36; H02M 3/158; H02M 3/00
  See application file for complete search history.

(56) References Cited

FOREIGN PATENT DOCUMENTS

JP      2020-177358      10/2020

OTHER PUBLICATIONS

International Search Report and Written Opinion in International Appln. No. PCT/JP2022/024896, mailed on Aug. 30, 2022, 13 pages (with machine translation).

*Primary Examiner* — Daniel Cavallari
(74) *Attorney, Agent, or Firm* — Fish & Richardson P.C.

(57)                ABSTRACT

A power supply device includes a power supply circuit that permits an output voltage to be supplied to a succeeding-stage circuit, an external terminal configured to be connectable to the succeeding-stage circuit and to a pull-up resistor to which a supply voltage is applied, a transistor having a first terminal connected to the external terminal, a controller that turns the transistor from on to off when, during start-up of the output voltage, the output voltage enters a normal range and a fault detection circuit that can detect at least one of an open fault, in which the external terminal remains open, and a short fault, in which the external terminal is short-circuited to an application terminal for the supply voltage.

14 Claims, 11 Drawing Sheets

POWER SUPPLY DEVICE INCLUDING FAULT DETECTION CIRCUIT

CROSS-REFERENCE TO RELATED APPLICATIONS

This nonprovisional application is a continuation application of International Patent Application No. PCT/JP2022/024896 filed on Jun. 22, 2022, which claims priority Japanese Patent Application No. 2021-117613 filed on Jul. 16, 2021, the entire contents of which are hereby incorporated by reference.

TECHNICAL FIELD

The present disclosure relates to a power supply device.

BACKGROUND ART

Conventionally, there are known ICs that output a power-good signal indicating whether an output voltage output from a power IC is normal (for example, Patent Document 1). The IC includes a power-good terminal and a transistor. The transistor is connected via the power-good terminal to an application terminal for a supply voltage outside the IC across pull-up resistor. If the transistor is on, the power-good signal, which is the voltage at the power-good terminal, turns to low level (output voltage fault); and if the transistor is off, the power-good signal turns to high level (normal output voltage). That is, the logic level of the power-good signal indicates the state of the output voltage.

CITATION LIST

Patent Literature

Patent Document 1: Japanese Unexamined Patent Application Publication No. 2020-177358

DESCRIPTION OF EMBODIMENTS

Hereinafter, an illustrative embodiment of the present disclosure will be described with reference to the drawings.

1. Overall Configuration of Power Supply Device

Figure 1:
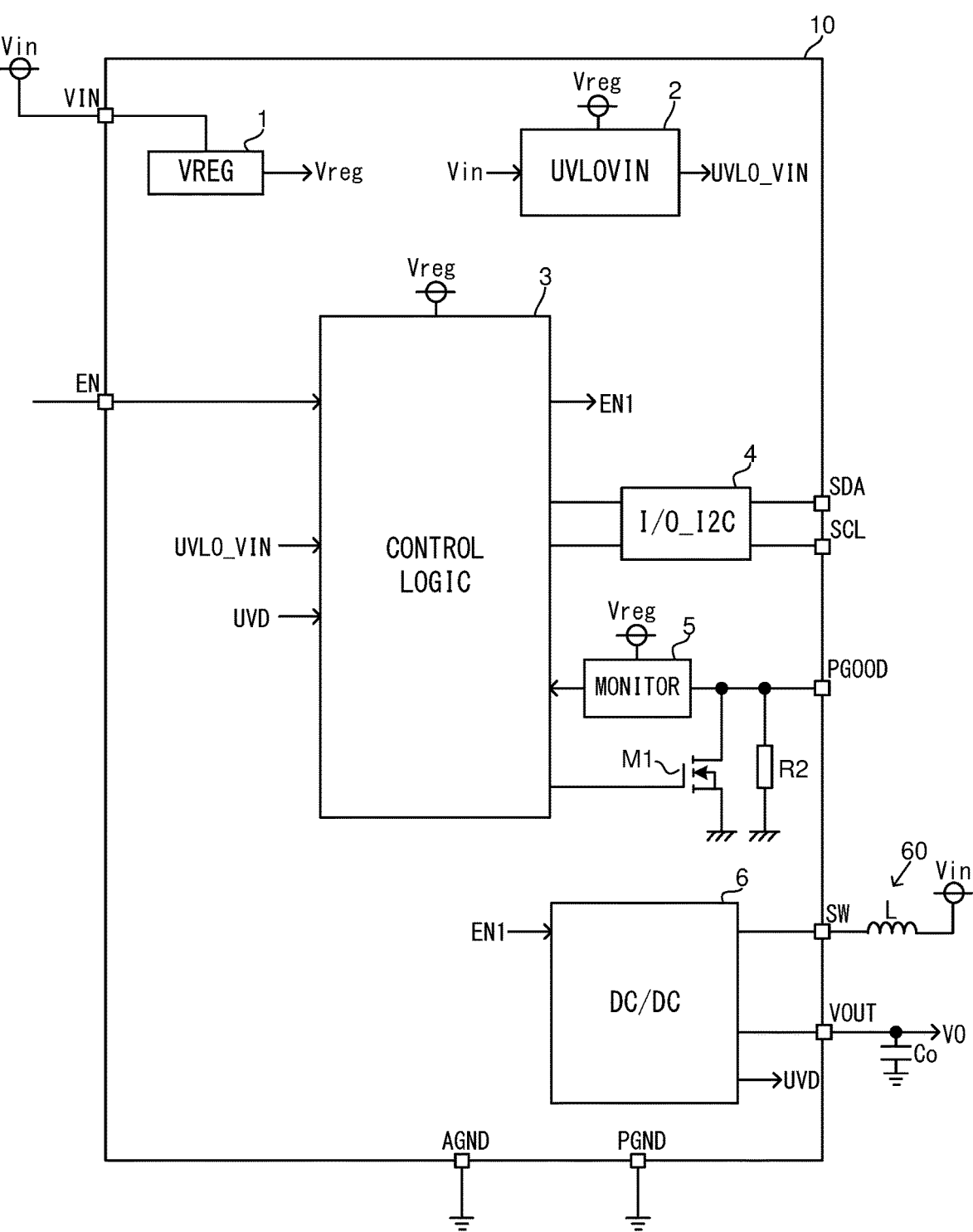
FIG. 1 is a diagram showing the configuration of a power supply device according to an illustrative embodiment of the present disclosure.

FIG. 1 is a diagram showing the configuration of a power supply device 10 according to an illustrative embodiment of the present disclosure.
The power supply device 10 is an IC package (semiconductor device) that can generate an output voltage VO.
As shown in FIG. 1, the power supply device 10 includes, as external terminals for establishing electrical connection with the outside, a VIN terminal, an SW terminal, an EN terminal, an AGND terminal, a VOUT terminal, a PGND terminal, a PGOOD terminal, an SDA terminal, and an SCL terminal. The various elements shown in FIG. 1 that are connected to the external terminals mentioned above are all discrete elements.
As shown in FIG. 1, the power supply device 10 has, integrated in one chip, an internal voltage generator 1, a supply voltage UVLO circuit 2, a control logic circuit 3, an I2C input-output circuit 4, a monitoring circuit 5, a DC/DC circuit 6, a transistor M1, and a resistor R2.
The VIN terminal is externally connected to an application terminal for an input supply voltage Vin. The internal voltage generator 1 generates an internal voltage Vreg based on the input supply voltage Vin applied to the VIN terminal. The internal voltage Vreg is used as the supply voltage for different blocks in the power supply device 10. The power supply device 10 may include a VREG terminal configured for output of the internal voltage Vreg.
The supply voltage UVLO circuit 2 is a fault protection circuit that detects an undervoltage fault in the input supply voltage Vin. The supply voltage UVLO circuit 2 feeds an UVLO signal UVLO_VIN to the control logic circuit 3. The control logic circuit 3 shuts down the IC when an undervoltage fault is detected in the input supply voltage Vin.
The DC/DC circuit 6, together with an inductor L and an output capacitor Co arranged outside the power supply device 10, constitutes a DC/DC converter 60. The DC/DC converter 60 is a boost converter that outputs the output voltage VO based on the input supply voltage Vin applied to the VIN terminal.
The SW terminal is a terminal to which the switching output of the DC/DC circuit 6 is applied. The SW terminal is connected to one terminal of the inductor L. The other terminal of the inductor L is connected to the VIN terminal. The VOUT terminal is connected to one terminal of the output capacitor Co.
Switching control in the DC/DC circuit 6 generates the output voltage VO at the VOUT terminal. The DC/DC converter is not limited to a boost converter, and may be, for example, a buck converter.
The control logic circuit 3 is a controller that comprehensively controls the power supply device 10.
The I2C input-output circuit 4 performs an I2C communication with the outside via the SDA and SCL terminals. I2C is one type of serial interface. The SDA terminal is used for input and output of serial interface data. The SCL terminal is used for input of a serial interface clock.

The transistor M1, the resistor R2, and the monitoring circuit 5 involved in a power-good function will be described later.

The DC/DC circuit 6 outputs an undervoltage detection signal UVD. The undervoltage detection signal UVD is an undervoltage detection signal with respect to the output voltage VO. The power supply device 10 can generate, for protection functions, an overvoltage detection signal, an overcurrent detection signal, an overheat detection signal, and the like in addition to what is shown in FIG. 1.

2. Configuration for Power-Good Function

Figure 2:
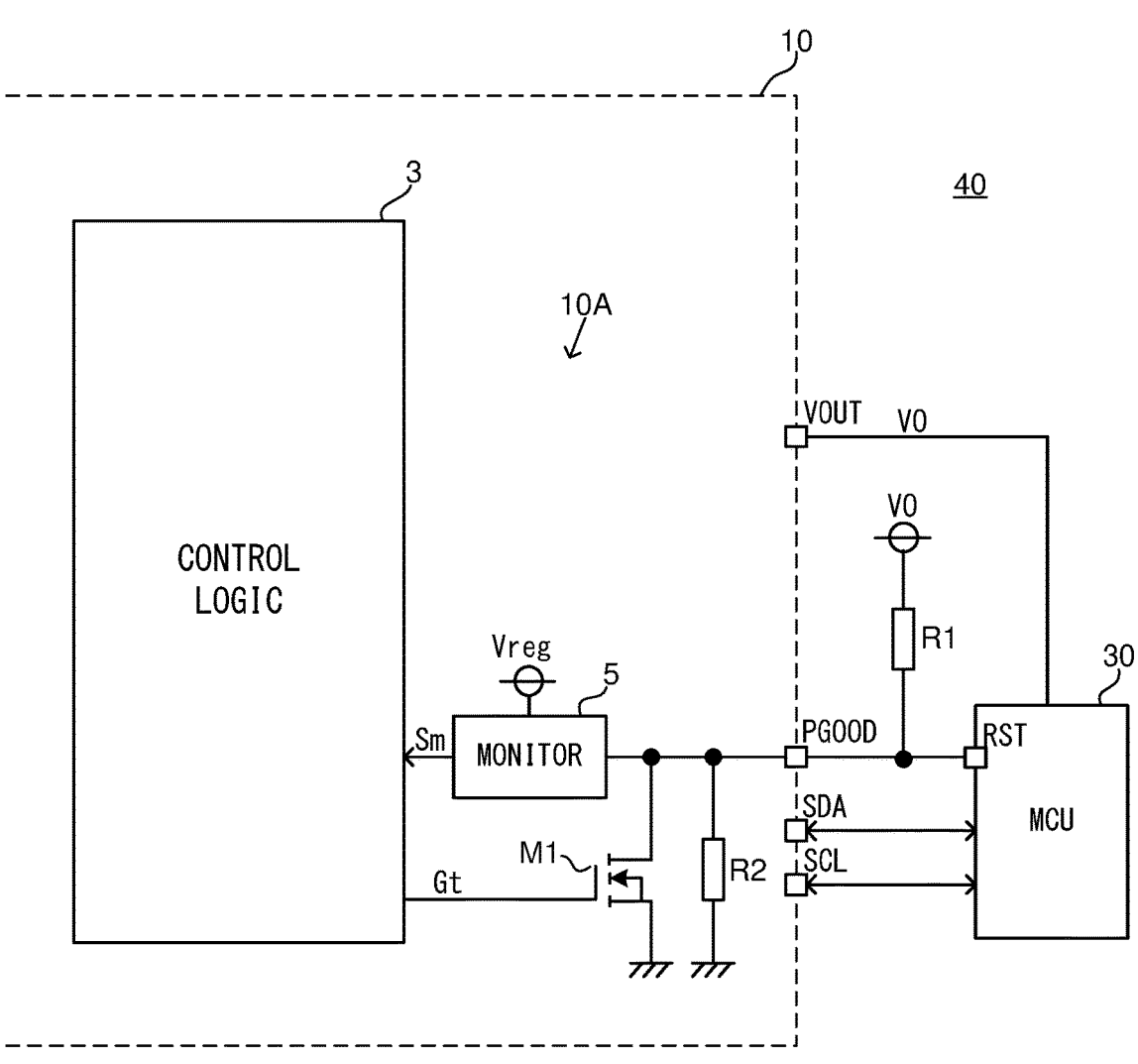
FIG. 2 is a diagram showing an outline of the configuration for a power-good function.

FIG. 2 is a diagram showing an outline of the configuration for a power-good function. As shown in FIG. 2, the output voltage VO output from the VOUT terminal is fed as the supply voltage to an MCU (microcontroller unit) 30 as one example of a succeeding-stage circuit. As shown in FIG. 2, the power supply device 10 and the MCU 30 constitute a power feeding system 40.

As shown in FIG. 2, the transistor M1 is configured as an NMOS transistor. The drain of the transistor M1 is connected to the PGOOD terminal (power-good terminal). The source of the transistor M1 is connected to an application terminal for a ground potential. The gate of the transistor M1 is fed with a gate signal Gt output from the control logic circuit 3. The transistor M1 may be configured as a bipolar transistor.

The PGOOD terminal is connected to one terminal of a pull-up resistor R1 provided outside the power supply device 10. The other terminal of the pull-up resistor R1 is connected to an application terminal for the output voltage VO. That is, in the example in FIG. 2, the other terminal of the pull-up resistor R1 is short-circuited to the VOUT terminal. In this way, the voltage at the PGOOD terminal is pulled up. The voltage applied to the other terminal of the pull-up resistor R1 is not limited to the output voltage VO, and may be a voltage different from the output voltage VO, such as the input supply voltage Vin. If the power supply device 10 has a plurality of DC/DC circuits including the DC/DC circuit 6, an output voltage generated by a DC/DC circuit different from the DC/DC circuit 6 may be applied to the other terminal of pull-up resistor R1.

When the output voltage VO is normal (when it is within a predetermined normal range), the transistor M1 is kept off by the control logic circuit 3 and the voltage at the PGOOD terminal is at high level. By contrast, when the output voltage VO is abnormal (when it is outside the predetermined normal range), the transistor M1 is kept on by the control logic circuit 3 and the voltage at the PGOOD terminal is at low level. That is, the state of the output voltage VO is output as the logic level at the PGOOD terminal.

Here, the PGOOD terminal is connected to an RST terminal (reset terminal) of an MCU 30. In this way, the voltage at the PGOOD terminal (power-good signal) can be fed as a reset signal to the RST terminal. Thus, when the output voltage VO becomes abnormal, the MCU 30 can be reset by the reset signal turning to low level. When the output voltage VO becomes normal, the MCU 30 can be un-reset by the reset signal turning to high level.

3. PGOOD Terminal Fault Detection Function

As shown in FIG. 2, the power supply device 10 includes a fault detection circuit 10A that detects a fault at the PGOOD terminal. The fault detection circuit 10A includes a control logic circuit 3 and a monitoring circuit 5. As will be described later, the fault detection circuit 10A can detect an open fault and a short fault at the PGOOD terminal.

An open fault, in which the PGOOD terminal remains open, results from improper mounting of the power supply device 10 on the substrate, coming-off of the power supply device 10 from the substrate after mounting, or the like. A short fault at the PGOOD terminal is a fault in which a short circuit across the pull-up resistor R1 results in the PGOOD terminal short-circuiting to an application terminal for the supply voltage (output voltage VO). A short fault may be caused by, for example, condensed water drops or the like.

The monitoring circuit 5 monitors the voltage at the PGOOD terminal and outputs a monitoring signal Sm with a logic level corresponding to the voltage at the PGOOD terminal to the control logic circuit 3. The control logic circuit 3 checks whether the PGOOD terminal is at fault based on the monitoring signal Sm from the monitoring circuit 5. The control logic circuit 3, on detecting a fault at the PGOOD terminal, performs predetermined operation as will be described later.

The resistor R2 is connected between the PGOOD terminal and the application terminal for the ground potential. The resistor R2 prevents the voltage at the PGOOD terminal from becoming indefinite due to detection of an open fault at the PGOOD terminal.

Figure 3:
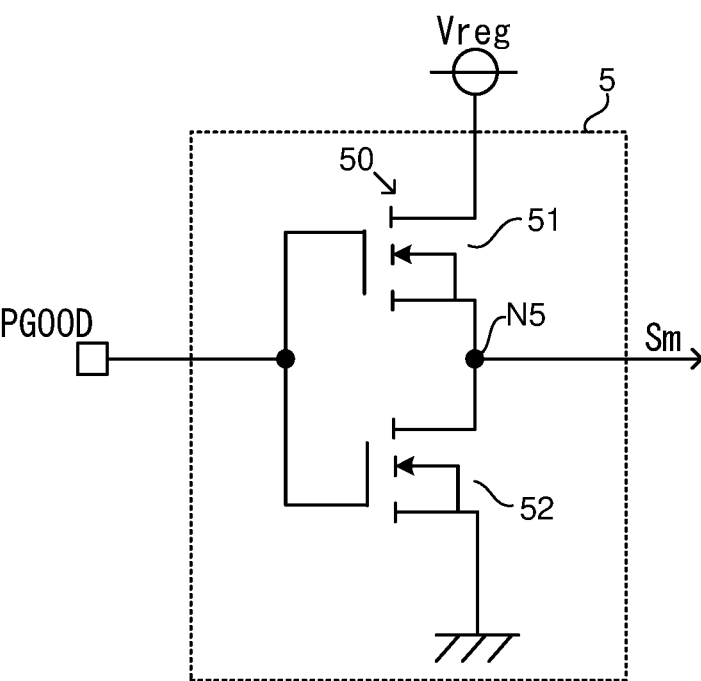
FIG. 3 is a diagram showing a specific example of a monitoring circuit.

FIG. 3 is a diagram showing a specific example of the monitoring circuit 5. The monitoring circuit 5 shown in FIG. 3 includes an inverter 50. Specifically, the inverter 50 has a PMOS transistor 51 and an NMOS transistor 52. The source of the PMOS transistor 51 is connected to an application terminal for the internal voltage Vreg. The drain of the PMOS transistor 51 is connected to the drain of the NMOS transistor 52 at a node N5. The source of the NMOS transistor 52 is connected to the application terminal for the ground potential. The gates of the PMOS and NMOS transistors 51 and 52 are connected to the PGOOD terminal. The monitoring signal Sm is output from the node N5.

Figure 4:
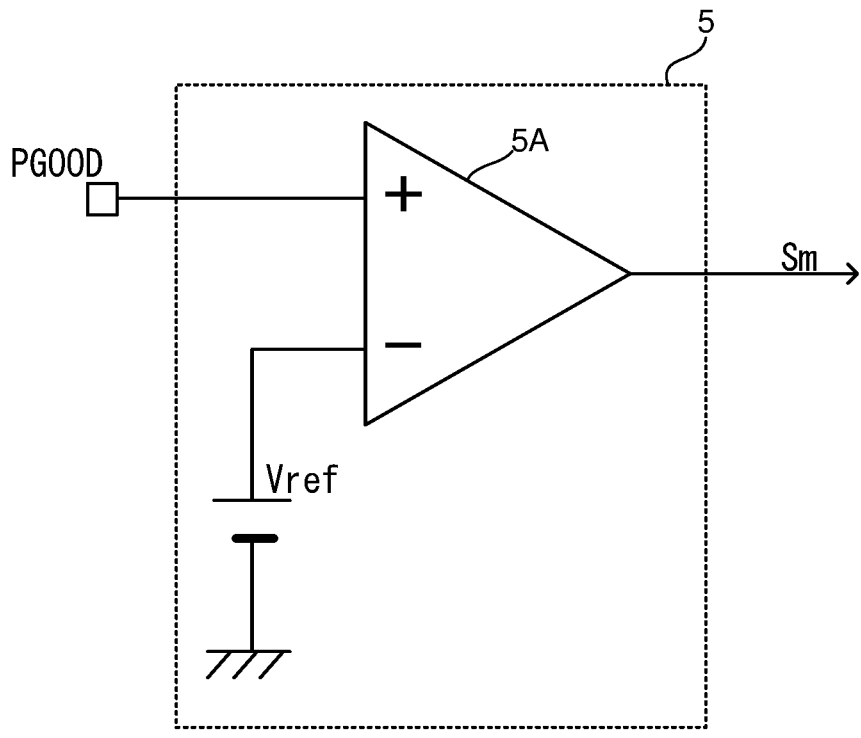
FIG. 4 is a diagram showing another specific example of the monitoring circuit.

FIG. 4 is a diagram showing another specific example of the monitoring circuit 5. The monitoring circuit 5 shown in FIG. 4 includes a comparator 5A. To the non-inverting input terminal (+) of the comparator 5A, the PGOOD terminal is connected. To the inverting input terminal (−) of the comparator 5A, an application terminal for a reference voltage Vref is connected. The monitoring signal Sm is output as a result of the comparison between the voltage at the PGOOD terminal and the reference voltage Vref by the comparator 5A.

4. Start-Up Operation of Power Supply Device

Figure 5:
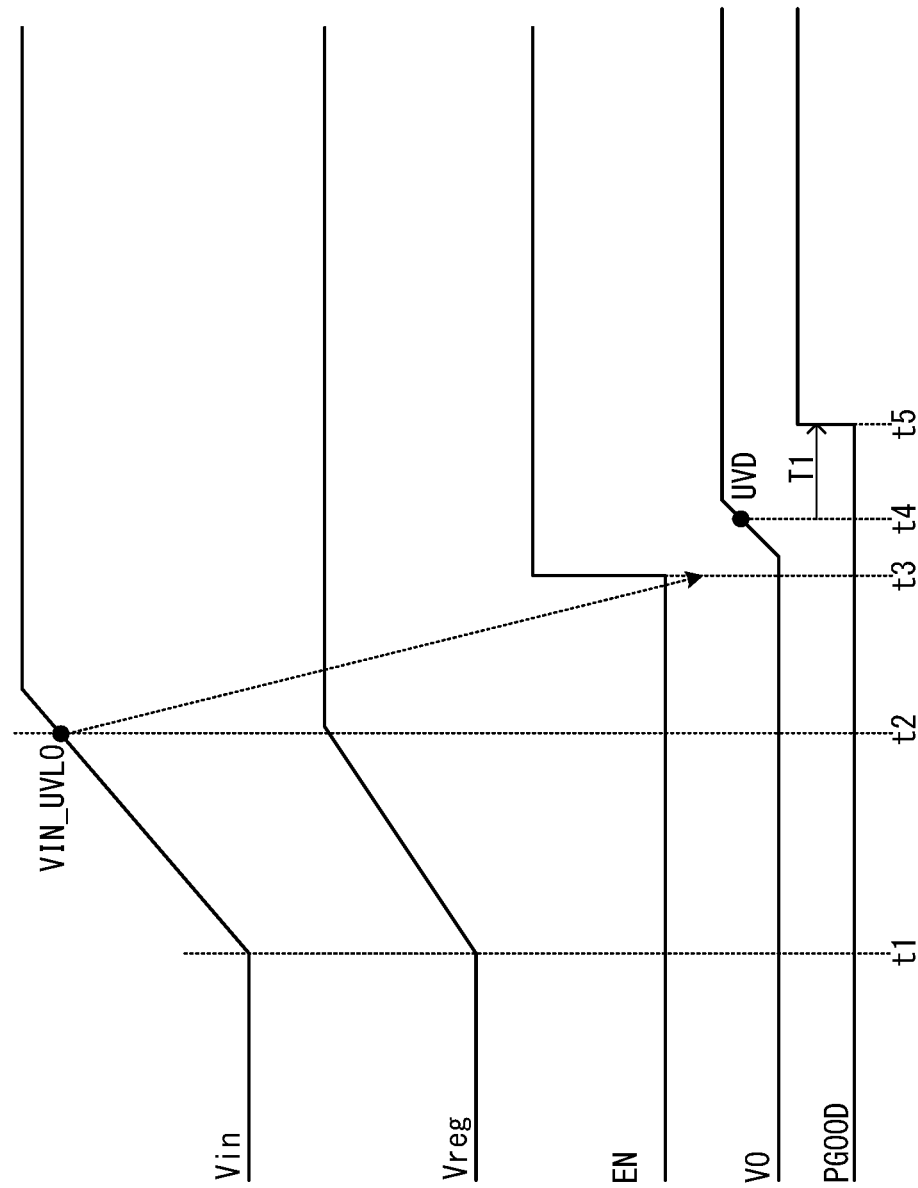
FIG. 5 is a timing chart showing one example of the start-up operation of the power supply device.

Next, the start-up operation of the power supply device 10 will be described with reference to a timing chart shown in FIG. 5. FIG. 5 shows an example of the waveforms of, from top down, the input supply voltage Vin, the internal voltage Vreg, the enable signal fed to the EN terminal, the output voltage VO, and the voltage at the PGOOD terminal.

At timing t1 shown in FIG. 5, the input supply voltage Vin starts to rise. At this timing, the internal voltage Vreg also starts to rise while the enable signal is at low level, the output voltage VO is 0V, and the voltage at the PGOOD terminal is at low level (the transistor M1 is on).

As the input supply voltage Vin rises, the internal voltage Vreg also rises. When the internal supply voltage Vin reaches an UVLO release voltage at timing t2, an UVLO signal UVLO_VIN indicating UVLO release is fed to the control logic circuit 3.

After that, when the enable signal rises to high level at timing t3, the control logic circuit 3 starts up the DC/DC circuit 6 by feeding the enable signal EN1 to the DC/DC circuit 6. Thus, the output voltage VO starts up. When the output voltage VO rises until it reaches a predetermined lower limit voltage that defines the normal range (timing t4), the undervoltage detection signal UVD indicating that is fed to the control logic circuit 3. Then the control logic circuit 3, at timing t5 at the lapse of a predetermined standby period T1 after timing t4, turns the transistor M1 off and thereby turns the voltage at the PGOOD terminal to high level. As in the configuration shown in FIG. 2 referred to above, the voltage at the PGOOD terminal is fed to the reset terminal RST of the MCU 30 and the MCU 30 is un-reset.

5. Normal Operation for Reset Function

Figure 6:
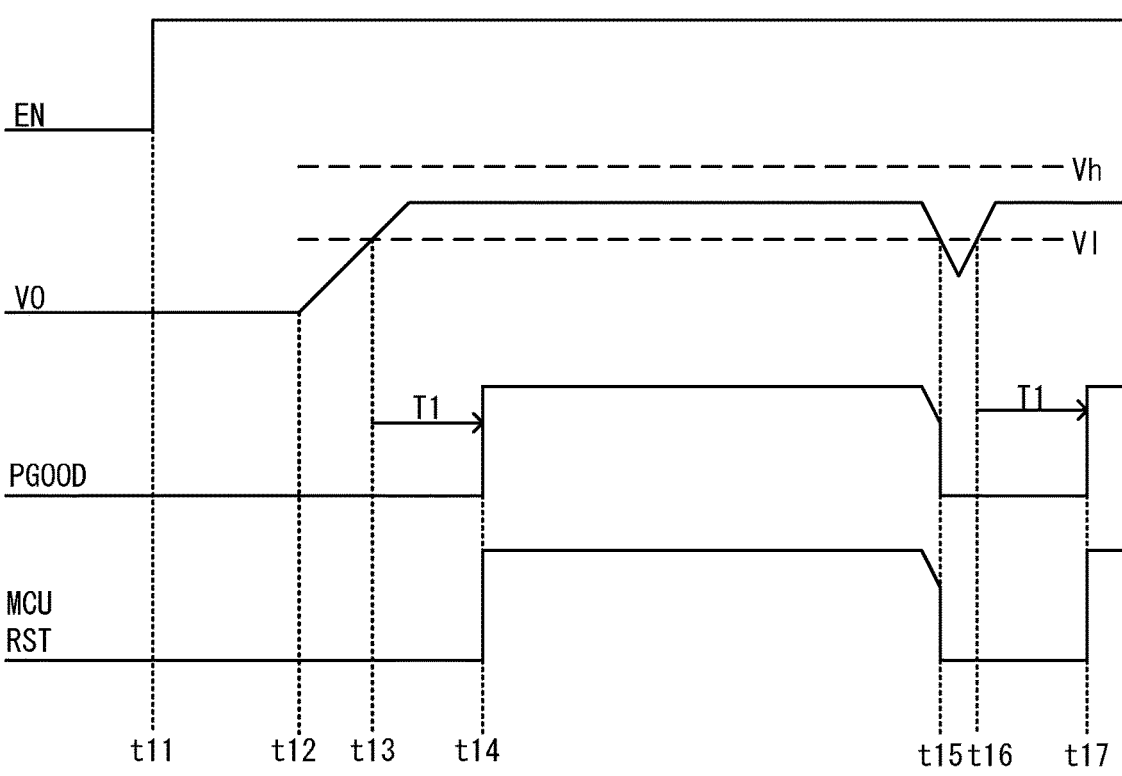
FIG. 6 is a timing chart showing one example of normal operation.

FIG. 6 is a timing chart showing normal operation. FIG. 6 shows an example of the waveforms of, from top down, the enable signal, the output voltage VO, the voltage at the PGOOD terminal, and the voltage at the reset terminal RST. The same applies to FIGS. 7 to 10, which will be referred to later.

As shown in FIG. 6, the enable signal rises at timing t11 (similar to timing t3 in FIG. 5). After that, at timing t12, the output voltage VO starts to rise.

Here, FIG. 6 shows the normal range of the output voltage VO for the MCU 30 to operate normally, and the normal range is defined to be more than or equal to a lower limit voltage V1 but less than or equal to an upper limit voltage Vh. When the output voltage VO rises until it reaches the lower limit voltage V1 (timing t13), the undervoltage detection signal UVD indicating that is fed to the control logic circuit 3.

If the output voltage VO remains within the normal range for the predetermined standby period T1 after timing t13 at which the rising output voltage VO reaches the lower limit voltage V1, then the control logic circuit 3, at the lapse of the standby period T1, turns the transistor M1 off and turns the voltage at the PGOOD terminal to high level (timing t14). Thus, the reset terminal RST is also turned to high level, so the MCU 30 is un-reset.

Thus, at timing t13 at which the output voltage VO enters the normal range, the voltage at the reset terminal RST is at low level and the MCU 30 starts preparation for operation (initialization). The standby period T1 is set to be equal to or longer than the time required for initialization. Accordingly, at timing t14 at the lapse of the standby period T1, initialization is complete and un-resetting permits the MCU 30 to operate.

As shown in FIG. 6, if the output voltage VO falls below the lower limit voltage V1 (timing t15), the undervoltage detection signal UVD indicating that is fed to the control logic circuit 3. Thus, the control logic circuit 3 turns the transistor M1 on and turns the voltage at the PGOOD terminal to low level. In response, the voltage at the reset terminal RST also turns to low level, so the MCU 30 is reset. Thus, when the output voltage VO goes out of the normal range, the operation of the MCU 30 can be stopped.

After that, when the output voltage VO returns to within the normal range (timing t16), if the output voltage VO is kept within the normal range for the standby period T1 after that timing, the control logic circuit 3 turns the transistor M1 off and turns the voltage at the PGOOD terminal to high level (timing t17). Thus, the voltage at the reset terminal RST also turns to high level, so the MCU 30 is un-reset.

6. Operation with Open Fault at PGOOD Terminal

Figure 7:
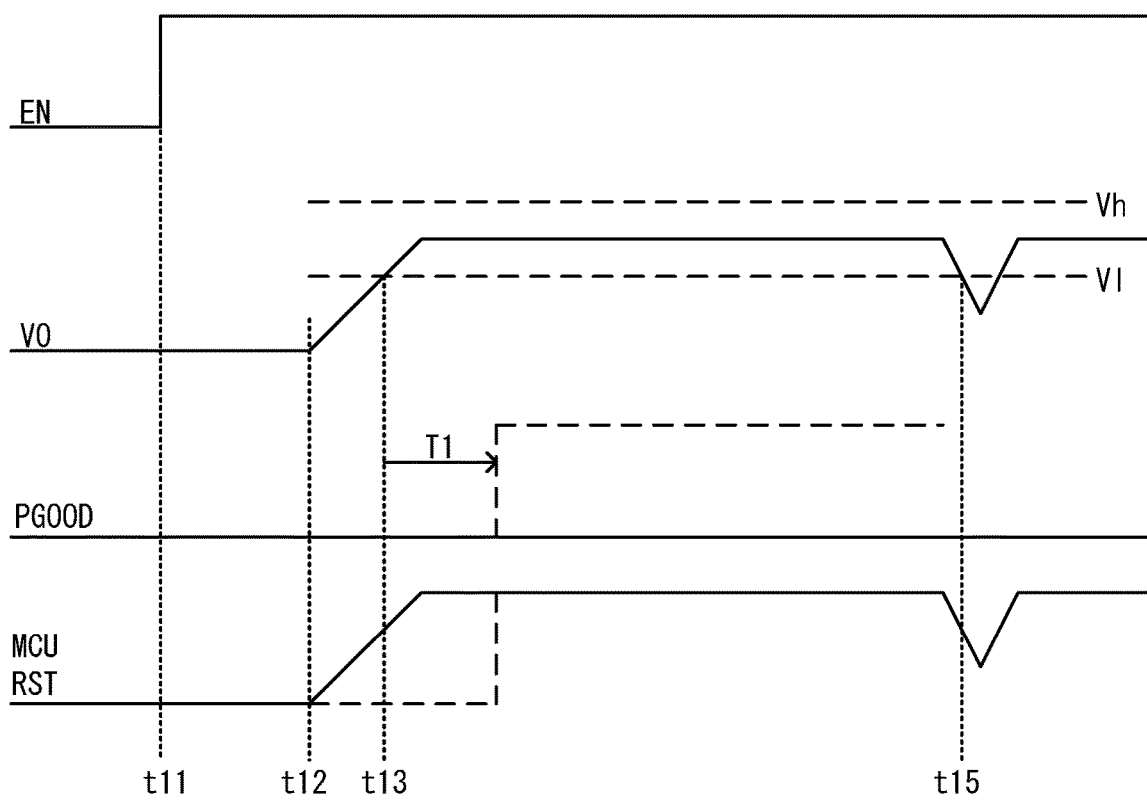
FIG. 7 is a timing chart showing one example of the operation when an open fault is at a PGOOD terminal (for a case where there is provided no fault detection function for the PGOOD terminal).

Next, operation on occurrence of an open fault at the PGOOD terminal will be described. FIG. 7 shows operation in such a condition, for a case where there is provided no fault detection function for the PGOOD terminal as in this embodiment.

In FIG. 7, as in FIG. 6 referred to previously, the enable signal rises (timing t11) and after that the output voltage VO starts to rise (timing t12). Here, the PGOOD terminal is open, so the voltage at the PGOOD terminal is indefinite. In FIG. 7, the voltage at the PGOOD terminal is kept at low level for convenience' sake. The voltage at the reset terminal RST is equal to the output voltage VO and rises like the output voltage VO.

Thus, at timing t13 at which the output voltage VO reaches the lower limit voltage V1 and enters the normal range, the voltage at the reset terminal RST also has risen to a voltage equal to the output voltage VO. Accordingly, even when the MCU 30 tries to start initialization at timing t13, since the voltage at the reset terminal RST is at high level, it may fail to be initialized.

As shown in FIG. 7, also if the output voltage VO goes out of the normal range (timing t15), the PGOOD terminal is open, so the voltage at the reset terminal RST behaves to have a voltage equal to the output voltage VO. Thus, the MCU 30 may fail to be reset.

Figure 8:
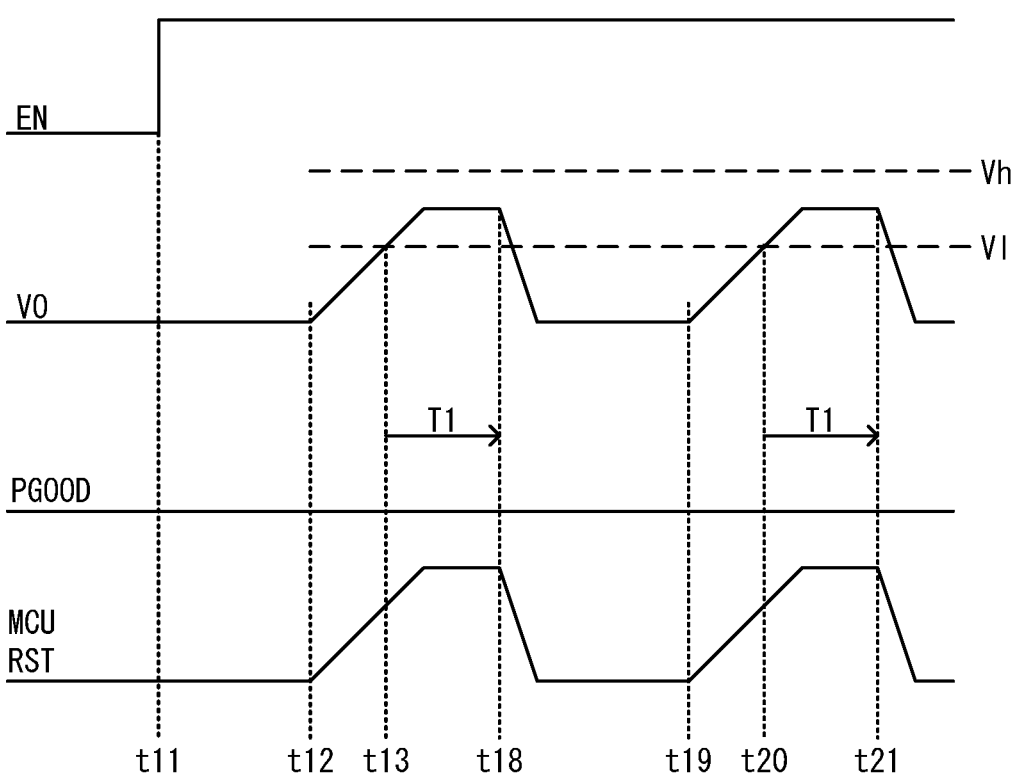
FIG. 8 is a timing chart showing one example of the operation when an open fault is at the PGOOD terminal (for a case where there is provided a fault detection function for the PGOOD terminal).

By contrast, FIG. 8 shows operation on occurrence of an open fault at the PGOOD terminal, for a case where there is provided a fault detection function for the PGOOD terminal according this embodiment. As shown in FIG. 8, when the output voltage VO starts to rise at timing t12, the voltage at the reset terminal RST also starts to rise.

When the output voltage VO reaches the lower limit voltage V1 and enters the normal range, if the output voltage VO remains within the normal range for the standby period T1 after that timing t13, the control logic circuit 3 turns the transistor M1 off (timing t18). Here, the control logic circuit 3 checks the monitoring signal Sm fed from the monitoring circuit 5.

If an open fault is at the PGOOD terminal, the voltage at the PGOOD terminal, which should normally be at high level, is at low level. The resistor R2 has a resistance value sufficiently larger than that of the pull-up resistor R1 and prevents the voltage at the PGOOD terminal from becoming indefinite. The logic level of the monitoring signal Sm is a level corresponding to the low level of the voltage at the PGOOD terminal. In this case, the control logic circuit 3 with the enable signal EN1 instructs the DC/DC circuit 6 to stop the output of the output voltage VO as shown in FIG. 8. In this way, the supply of electric power to the MCU 30 is stopped.

After that, the control logic circuit 3 starts up the output voltage VO again (timing t19). Then, when the output voltage VO reaches the lower limit voltage V1 and enters the normal range (timing t20), if the output voltage VO remains within the normal range for the standby period T1 after that timing t20, the control logic circuit 3 turns the transistor M1 off (timing t21). Here, the control logic circuit 3 checks the monitoring signal Sm fed from the monitoring circuit 5.

Here, if the logic level of the monitoring signal Sm is a level appearing when an open fault is at the PGOOD terminal, the control logic circuit 3 stops the output of the output voltage VO.

If the stopping of the output voltage VO as shown in FIG. 8 is repeated a predetermined number of times, the control logic circuit 3 thereafter stops the output of the output voltage VO. That is, the system of the power supply device 10 is stopped. The predetermined number of times may be any number of two or more.

As described above, with this embodiment, if an open fault at the PGOOD terminal is detected using the monitoring signal Sm, it is possible to stop the output of the output voltage VO to prevent the MCU 30 from performing unexpected abnormal operation. If an open fault at the PGOOD terminal persists, the system of the power supply device 10 is stopped and thus the start-up of the MCU 30 can be inhibited.

Note that, when the monitoring signal Sm is checked at the lapse of the standby period T1 as described above (timing t18 or timing t21), if the monitoring signal Sm is at a level indicating normal operation (i.e., the voltage at PGOOD terminal is at high level), the control logic circuit 3 continues the output of the output voltage VO. Thus, when the PGOOD terminal recovers from an open fault to the normal state, the MCU 30 can continue to operate.

7. Operation with Short Fault at PGOOD Terminal

Figure 9:
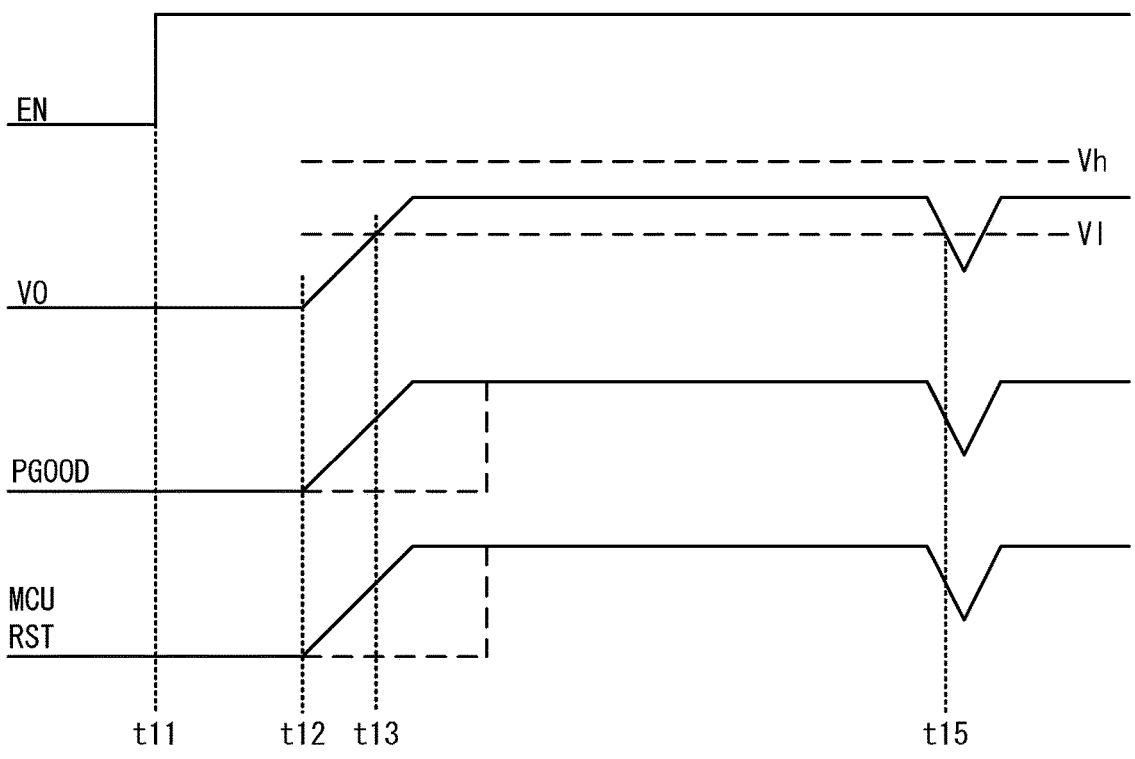
FIG. 9 is a timing chart showing one example of the operation when a short fault is at the PGOOD terminal (for a case where there is provided no fault detection function for the PGOOD terminal).

Next, operation on occurrence of a short fault at the PGOOD terminal will be described. FIG. 9 shows operation in such a condition, for a case where there is provided no fault detection function for the PGOOD terminal as in this embodiment.

In FIG. 9, as in FIG. 6 referred to previously, the enable signal rises (timing t11) and after that the output voltage VO starts to rise (timing t12). Here, the PGOOD terminal is at a short fault, being short-circuited to the application terminal for the output voltage VO, so the voltage at the PGOOD terminal is equal to the output voltage VO and rises like the output voltage VO. The voltage at the reset terminal RST is also equal to the output voltage VO and rises like the output voltage VO.

Thus, at timing t13 at which the output voltage VO reaches the lower limit voltage V1 and enters the normal range, the voltage at the reset terminal RST also has risen to a voltage equal to the output voltage VO. Accordingly, even when the MCU 30 tries to start initialization at timing t13, since the voltage at the reset terminal RST is at high level, it may fail to be initialized.

As shown in FIG. 9, also if the output voltage VO goes out of the normal range (timing t15), a short fault is at the PGOOD terminal, so the voltage at the reset terminal RST behaves to have a voltage equal to the output voltage VO. Thus, the MCU 30 may fail to be reset.

Figure 10:
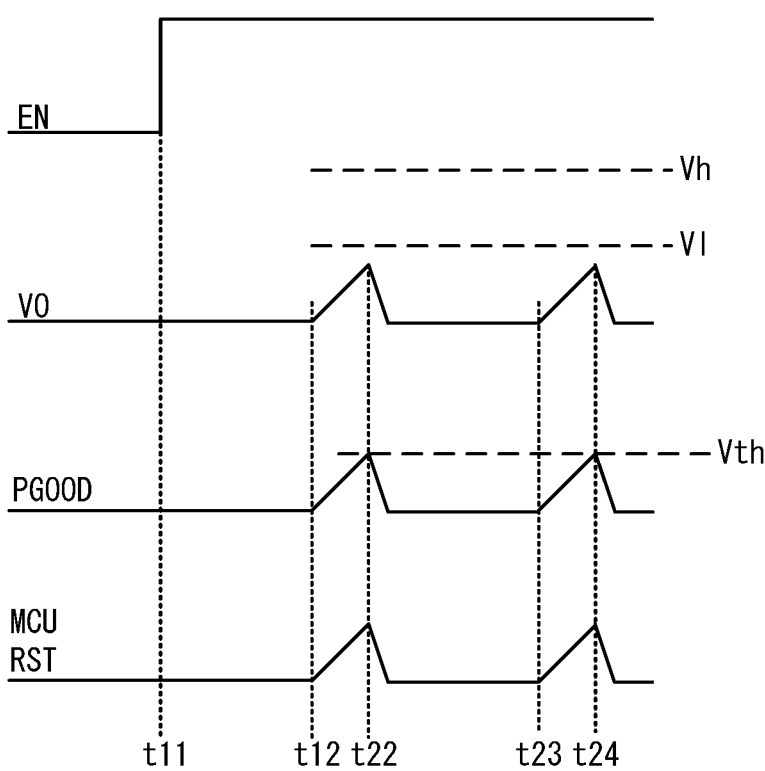
FIG. 10 is a timing chart showing one example of the operation when a short fault is at the PGOOD terminal (for a case where there is provided a fault detection function for the PGOOD terminal).

By contrast, FIG. 10 shows operation on occurrence of a short fault at the PGOOD terminal, for a case where there is provided a fault detection function for the PGOOD terminal according this embodiment. As shown in FIG. 10, when the output voltage VO starts to rise at timing t12, the voltage at the PGOOD terminal and the voltage at the reset terminal RST also start to rise.

At timing t12 when the output voltage VO starts to rise, the control logic circuit 3 starts to monitor the monitoring signal Sm fed from the monitoring circuit 5. Specifically, the control logic circuit 3 monitors whether, before the output voltage VO reaches the lower limit voltage V1, the level of the monitoring signal Sm turns to a level corresponding to the voltage at the PGOOD terminal reaching a predetermined threshold voltage Vth.

Normally, as shown in FIG. 6, the voltage at the PGOOD terminal is kept at low level until the output voltage VO reaches the lower limit voltage V1; however, if a short fault is at the PGOOD terminal, as shown in FIG. 10, the output voltage VO reaches the threshold voltage Vth (timing t22). Thus, when the level of the monitoring signal Sm turns, the control logic circuit 3 stops the output of the output voltage VO as shown in FIG. 10. In this way, the supply of electric power to the MCU 30 is stopped.

After that, the control logic circuit 3 starts up the output voltage VO again (timing t23). Here, the control logic circuit 3 starts to monitor the monitoring signal Sm fed from the monitoring circuit 5 again.

Here, as shown in FIG. 10, if the voltage at the PGOOD terminal reaches the threshold voltage Vth and the logic level of the monitoring signal Sm turns again, the control logic circuit 3 stops the output of the output voltage VO again (timing t24).

If the stopping of the output voltage VO as shown in FIG. 10 is repeated a predetermined number of times, the control logic circuit 3 thereafter stops the output of the output voltage VO. That is, the system of the power supply device 10 is stopped. The predetermined number of times may be any number of two or more.

As described above, with this embodiment, if a short fault at the PGOOD terminal is detected using the monitoring signal Sm, it is possible to stop the output of the output voltage VO to prevent the MCU 30 from performing unexpected abnormal operation. If a short fault at the PGOOD terminal persists, the system of the power supply device 10 is stopped and thus the start-up of the MCU 30 can be inhibited.

If the monitoring signal Sm does not turn until the output voltage VO reaches the lower limit voltage V1, assuming that the PGOOD terminal is normal, the control logic circuit 3 continues the output of the output voltage VO. Thus, when the PGOOD terminal recovers from a short fault to the normal state, the MCU 30 can operate.

The threshold voltage Vth may be set to a level that the voltage at the PGOOD terminal can reach after the output voltage VO reaches the lower limit voltage V1, before the lapse of the standby period T1. In this case, the control logic circuit 3 can start to monitor the monitoring signal Sm when the output voltage VO reaches the lower limit voltage V1 and monitor whether the level of the monitoring signal Sm turns before the lapse of the standby period T1.

8. Modified Examples

In the embodiment described above, as the operation performed by the control logic circuit 3 when a fault at the PGOOD terminal is detected, the output of the output voltage VO is stopped; instead, the output of the output voltage VO may be continued and a fault may be indicated to the MCU 30 by communication using 12C. The indication of a fault may be achieved using the SDA or SCL terminal shown in FIG. 2. This is particularly effective when a fault at the PGOOD terminal does not critically affect the operation of the MCU 30.

The embodiment may be modified to detect only one of an open and a short fault at the PGOOD terminal.

9. Application to Vehicles

Figure 11:
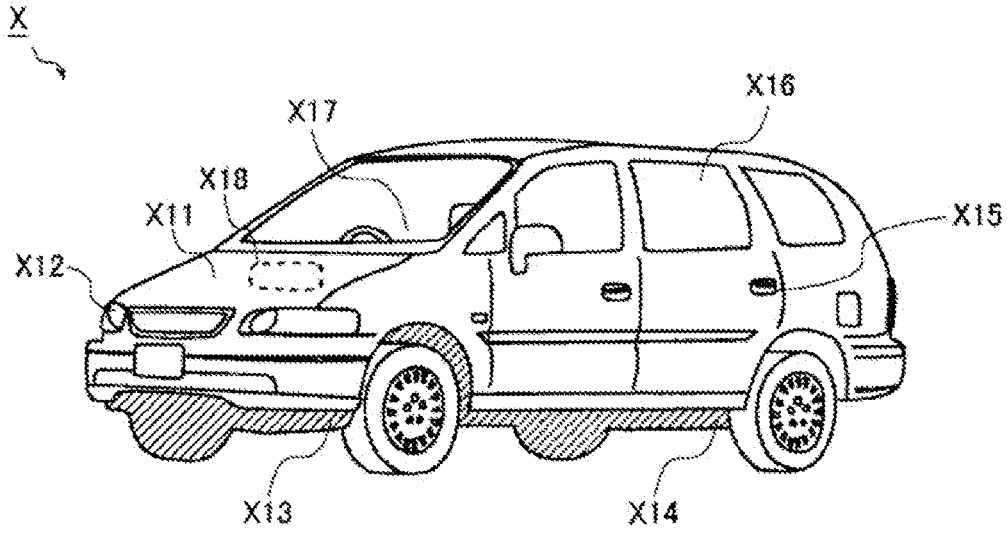
FIG. 11 is an external appearance view showing one configuration example of a vehicle.

FIG. 11 is an external appearance view showing one configuration example of a vehicle. The vehicle X of this configuration example incorporates a battery (not illustrated) and various electronic devices X11 to X18 that operate by receiving a supply voltage from the battery. For convenience' sake, the locations of the electronic devices X11 to X18 in FIG. 11 may differ from their actual locations.

The electronic device X11 is an engine control unit that performs control related to an engine (injection control, electronic throttle control, idling control, oxygen sensor heater control, automatic cruise control, and the like).

The electronic device X12 is a lamp control unit that controls the turning on and off of HIDs (high-intensity discharged lamps), DRLs (daytime running lamps), and the like.

The electronic device X13 is a transmission control unit that performs control related to a transmission.

The electronic device X14 is a body control unit that performs control related to the movement of the vehicle X (ABS [anti-lock braking system] control, EPS [electric power steering] control, electric suspension control, and the like).

The electronic device X15 is a security control unit that drives and controls door locks, burglar alarms, and the like.

The electronic device X16 comprises electronic devices installed in the vehicle as standard or manufacturer-fitted equipment at the stage of factory shipment, such as wipers, power side mirrors, power windows, dampers (shock absorbers), a power sun roof, and power seats.

The electronic device X17 comprises electronic devices optionally attached to the vehicle X as user-fitted equipment, such as vehicle-onboard A/V (audio-visual) equipment, a car navigation system, and an ETC (electronic toll collection system).

The electronic device X18 comprises electronic devices with high-withstand-voltage motors such as a vehicle-on-board blower, an oil pump, a water pump, and a battery cooling fan.

The power supply device 10 described previously can be incorporated in any of the electronic devices X11 to X18.

10. Notes

As described above, for example, according to one aspect of the present disclosure, a power supply device (10) includes:

a power supply circuit (6) that permits an output voltage (VO) to be supplied to a succeeding-stage circuit (30);

an external terminal (PGOOD) configured to be connectable to the succeeding-stage circuit and to a pull-up resistor (R1) to which a supply voltage (VO) is applied;

a transistor (M1) having a first terminal connected to the external terminal;

a controller (3) that turns the transistor from on to off when, during the start-up of the output voltage, the output voltage enters a normal range; and a fault detection circuit (10A) that can detect at least one of an open fault, in which the external terminal remains open, and a short fault, in which the external terminal is short-circuited to an application terminal for the supply voltage. (A first configuration).

In the power supply device of the first configuration described above, on detecting the open fault or the short fault, the fault detection circuit (10A) may instruct the power supply circuit (6) to stop outputting the output voltage. (A second configuration).

In the power supply device of the second configuration described above, after stopping of the output of the output voltage, the fault detection circuit (10A) may start up the output voltage again, and if the stopping of the output of the output voltage is repeated a predetermined number of times, the fault detection circuit may thereafter stop the output of the output voltage. (A third configuration).

In the power supply device of the first configuration described above, on detecting the open fault or the short fault, the fault detection circuit (10A) may continue the output of the output voltage and may indicate a fault to the succeeding-stage circuit (30) by communication. (A fourth configuration).

In the power supply device of any one of the first to fourth configurations described above, the controller (3) may turn the transistor (M1) from on to off if the output voltage remains within the normal range for a predetermined period after the output voltage reaches a predetermined lower limit voltage, and at the lapse of the predetermined period after the output voltage reaches the lower limit voltage, the fault detection circuit (10A) may detect the open fault based on the voltage at the external terminal (PGOOD). (A fifth configuration).

The power supply device of the fifth configuration described above may further include a resistor (R2) configured to be connectable between the external terminal (PGOOD) and an application terminal for a ground potential. (A sixth configuration).

In the power supply device of any one of the first to sixth configurations described above, the fault detection circuit (10A) may detect the short fault by detecting the voltage at the external terminal reaching a predetermined threshold voltage (Vth) at a timing at which the voltage at the external terminal (PGOOD) should normally be at low level. (A seventh configuration).

In the power supply device of any one of the first to seventh configurations described above, the application terminal for the supply voltage (VO) may be connectable to an application terminal for the output voltage (VO). (An eighth configuration).

The power supply device of any one of the first to eighth configurations described above may further include the fault detection circuit (10A) including a monitoring circuit (5) that outputs a monitoring signal (Sm) with a logic level corresponding to the voltage at the external terminal (PGOOD), and a control logic circuit (3) that detects a fault based on the monitoring signal. (A ninth configuration).

In the power supply device of the ninth configuration described above, the monitoring circuit (5) may include an inverter (50) fed with the voltage at the external terminal (PGOOD). (A tenth configuration).

In the power supply device of the ninth configuration described above, the monitoring circuit (5) may include a comparator (5A) fed with the voltage at the external terminal (PGOOD) and a reference voltage (Vref). (An eleventh configuration).

In the power supply device of any one of the first to eleventh configurations described above, the external terminal (PGOOD) may be connectable to a reset terminal (RST) of an MCU (30) as the succeeding-stage circuit. (A twelfth configuration).

The power supply device (10) of any one of the first to twelfth configurations described above may be for vehicle-onboard use. (A thirteenth configuration).

According to another aspect of what is disclosed herein, a power feeding system (40) includes the power supply device (10) according to any one of the configurations described above, and the succeeding-stage circuit (30) that is fed with the output voltage from the power supply device.

11. Others

The various technical features disclosed herein can be implemented in any manners other than as in the above-described embodiments with any modifications made without departure from the spirit of the technical creations. That is, it should be understood that the above-described embodiments are in every aspect illustrative and not restrictive. The technical scope of the present disclosure is defined not by the description of the embodiments given above but by the appended claims, and encompasses any modifications made within a scope equivalent in significance to those claims.

INDUSTRIAL APPLICABILITY

The present disclosure finds applications in, for example, power supply devices for vehicle-onboard use.

REFERENCE SIGNS LIST

1 internal voltage generator
2 supply voltage UVLO circuit
3 control logic circuit
4 12C input-output circuit
5 monitoring circuit
5A comparator
6 DC/DC circuit
10 power supply device
10A fault detection circuit
30 MCU
40 power feeding system
50 inverter
51 PMOS transistor
52 NMOS transistor
60 DC/DC converter
Co output capacitor
L inductor
M1 transistor
R1 pull-up resistor
R2 resistor
RST reset terminal
X vehicle
X11-X18 electronic device

The invention claimed is:
1. A power supply device comprising:
a power supply circuit configured to permit an output voltage to be supplied to a succeeding-stage circuit;
an external terminal connected to the succeeding-stage circuit and to a pull-up resistor to which a supply voltage is applied;
a transistor having a first terminal connected to the external terminal;
a controller configured to turn the transistor from on to off when, during start-up of the output voltage, the output voltage enters a normal range; and
a fault detection circuit configured to detect at least one of an open fault, in which the external terminal remains open, and a short fault, in which the external terminal is short-circuited to an application terminal for the supply voltage.
2. The power supply device according to claim 1, wherein the fault detection circuit is further configured to instruct the power supply circuit to stop outputting the output voltage based on detecting the open fault or the short fault.

3. The power supply device according to claim 2, wherein the fault detection circuit is configured to start up the output voltage again subsequent to stopping output of the output voltage, and
the fault detection circuit is configured to stop the output of the output voltage based on a predetermined number of times that stopping output of the output voltage has been repeated.
4. The power supply device according to claim 1, wherein the fault detection circuit is configured to continue the output of the output voltage and indicate a fault to the succeeding-stage circuit based on detecting the open fault or the short fault.
5. The power supply device according to claim 1, wherein the controller is configured to turn the transistor from on to off based on the output voltage remaining within the normal range for a predetermined period after the output voltage reaches a predetermined lower limit voltage, and
at a lapse of the predetermined period after the output voltage reaches the lower limit voltage, the fault detection circuit is configured to detect the open fault based on a voltage at the external terminal.
6. The power supply device according to claim 5, further comprising:
an additional resistor connected between the external terminal and an application terminal that provides a ground potential.
7. The power supply device according to claim 1, wherein the fault detection circuit is configured to detect the short fault by detecting that a voltage at the external terminal has reached a predetermined threshold voltage at a time at which the voltage at the external terminal should normally be at low level.
8. The power supply device according to claim 1, wherein the application terminal for the supply voltage is connected to an application terminal for the output voltage.
9. The power supply device according to claim 1, wherein the fault detection circuit includes:
a monitoring circuit configured to output a monitoring signal with a logic level corresponding to the voltage at the external terminal; and
a control logic circuit configured to detect a fault based on the monitoring signal.
10. The power supply device according to claim 9, wherein
the monitoring circuit includes an inverter connected to the external terminal to receive the voltage at the external terminal.
11. The power supply device according to claim 9, wherein
the monitoring circuit includes a comparator arranged to receive the voltage at the external terminal and a reference voltage.
12. The power supply device according to claim 1, wherein
the external terminal is connected to a reset terminal of an MCU as the succeeding-stage circuit.
13. The power supply device according to claim 1, wherein the power supply device is a component of an electronic device of a vehicle.
14. A power feeding system comprising:
the power supply device according to claim 1; and
the succeeding-stage circuit.

* * * * *